(12) United States Patent
Aggelopoulos

(10) Patent No.: US 8,864,964 B2
(45) Date of Patent: Oct. 21, 2014

(54) ELECTROLYZED HYDROGEN GAS ENHANCEMENT OF HYDROCARBON FUEL COMBUSTION

(75) Inventor: Tasos Aggelopoulos, Honolulu, HI (US)

(73) Assignee: Tasos Inc., Honolulu, HI (US)

( * ) Notice: Subject to any disclaimer, the term of this patent is extended or adjusted under 35 U.S.C. 154(b) by 212 days.

(21) Appl. No.: 13/227,823

(22) Filed: Sep. 8, 2011

(65) Prior Publication Data
US 2012/0067021 A1  Mar. 22, 2012

Related U.S. Application Data

(60) Provisional application No. 61/403,942, filed on Sep. 22, 2010.

(51) Int. Cl.
| | |
|---|---|
| C25B 1/04 | (2006.01) |
| C25B 9/00 | (2006.01) |
| C25B 1/08 | (2006.01) |
| C25B 15/08 | (2006.01) |
| F02M 25/12 | (2006.01) |
| C25B 9/06 | (2006.01) |

(52) U.S. Cl.
CPC .................. *C25B 1/08* (2013.01); *F02M 25/12* (2013.01); *Y02T 10/121* (2013.01); *C25B 15/08* (2013.01); *C25B 9/063* (2013.01); *Y02E 60/366* (2013.01)
USPC . 204/277; 422/186; 422/186.01; 422/186.02; 422/186.03; 422/186.04; 422/186.05; 422/186.06; 422/186.07; 422/186.08; 422/186.09; 422/186.1; 422/186.11; 422/186.12; 422/186.13; 422/186.14; 422/186.15; 422/186.16; 422/186.2; 422/186.18; 422/186.19; 422/186.21; 422/186.22; 422/186.23; 422/186.24; 422/186.25; 422/186.26; 422/186.27; 422/186.28; 422/186.29; 422/186.3; 422/187; 96/2; 204/275.1; 204/155

(58) Field of Classification Search
CPC .............. C25B 1/04; C25B 1/08; C25B 9/00; C25B 15/08; Y02E 10/00; Y02E 20/00; Y02E 60/366; Y02T 10/121
USPC ............... 204/155, 277, 275.1; 422/186–187; 96/2
See application file for complete search history.

(56) References Cited

U.S. PATENT DOCUMENTS 1,553,737 A * 9/1925 Allingham ........................ 95/28
4,909,912 A * 3/1990 Oda et al. ...................... 205/524
(Continued)

FOREIGN PATENT DOCUMENTS

KR    10-2008-0059533 A    6/2008

OTHER PUBLICATIONS

Dulger & Ozcelik, Fuel Economy Improvement by on Board Electrolytic Hydrogen Production, International Journal of Hydrogen Energy, vol. 25, p. 895-897, Pergamon Press, 2000.

*Primary Examiner* — James Lin
*Assistant Examiner* — Zulmariam Mendez
(74) *Attorney, Agent, or Firm* — Leighton K. Chong

(57) ABSTRACT

A system employs a closed electrolyzer vessel into which water is circulated, and an electrode plate assembly is immersed to dissociate water into hydrogen and oxygen gases. Only water is used as the electrolyte fluid. An air injector in the water return line injects air bubbling for enhanced dissociation of water. The electrode plate assembly is formed by one or more unit stacks of 7-plates each, including two outer cathode plates, a middle anode plate, and spaced inner plates. The generated gases are maintained in a stable condition by an electromagnetic coil assembly that separates the hydrogen gas from oxygen gas. The system can obtain 180% reduction in fuel usage in a vehicle engine, and 20 times reduction in carbon exhaust. It can obtain a 500% increase in fuel efficiency in an electrical power generator.

10 Claims, 7 Drawing Sheets

(56) References Cited

U.S. PATENT DOCUMENTS

| | | |
|---|---|---|
| 5,105,773 A | 4/1992 | Cunningham |
| 5,513,600 A | 5/1996 | Teves |
| 6,257,175 B1 | 7/2001 | Mosher |
| 7,021,249 B1 | 4/2006 | Christison |
| 2001/0010296 A1* | 8/2001 | Hirota et al. .................. 210/175 |
| 2007/0012264 A1 | 1/2007 | Holt |
| 2008/0302670 A1 | 12/2008 | Boyle |
| 2009/0148734 A1 | 6/2009 | Wang |
| 2010/0038236 A1 | 2/2010 | Rivera |
| 2010/0147232 A1 | 6/2010 | Heath |

* cited by examiner

ONBOARD INDICATORS CIRCUIT SCHEMATIC

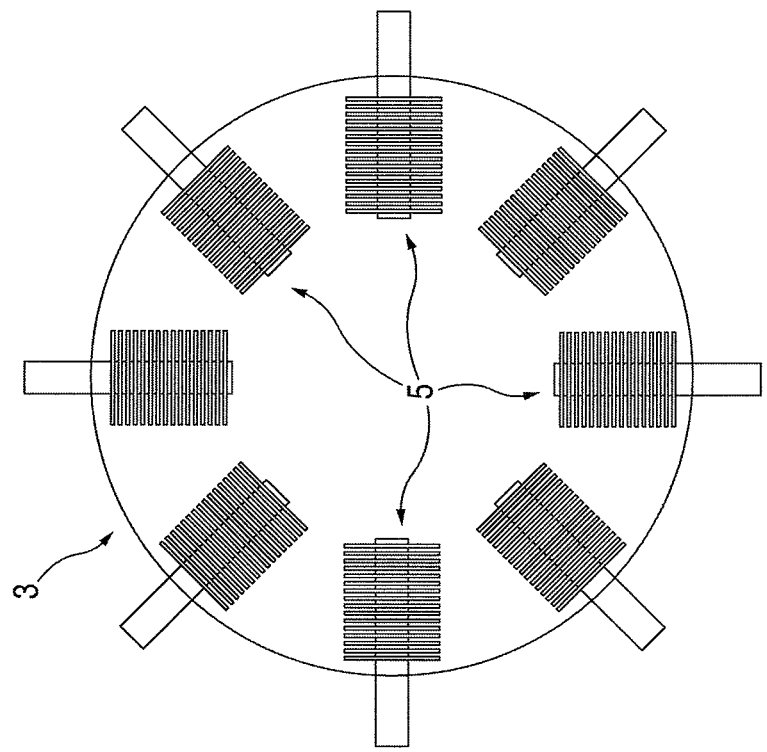
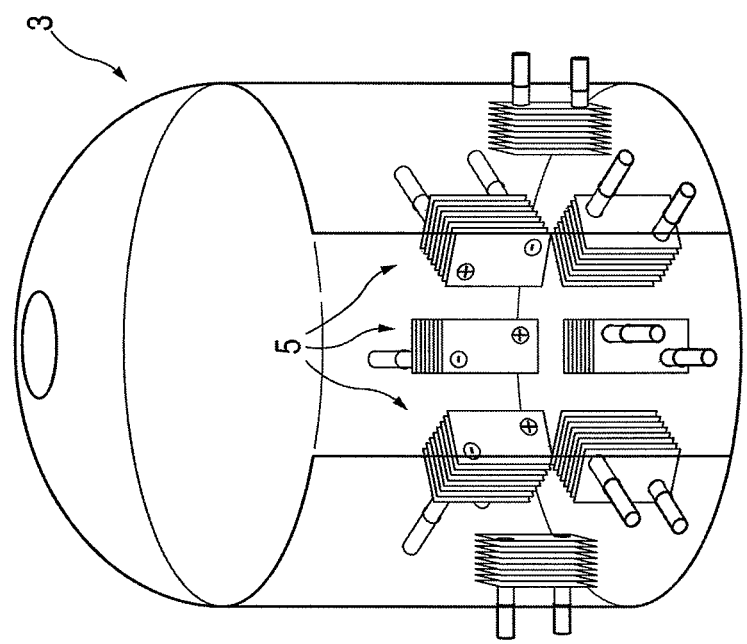
FIG. 7B
FIG. 7A

ELECTROLYZED HYDROGEN GAS ENHANCEMENT OF HYDROCARBON FUEL COMBUSTION

The present U.S. patent application claims the priority filing date of U.S. Provisional Patent Application Ser. No. 61/403,942 filed on Oct. 12, 2010.

FIELD OF INVENTION

The present invention relates to a system for electrolyzed hydrogen gas enhancement of hydrocarbon fuel combustion, particularly for hydrocarbon fuel combustion in internal combustion engines.

BACKGROUND OF INVENTION

It has previously been proposed that hydrogen gas produced by electrolysis can be injected into or mixed with a hydrocarbon fuel-air mixture to increase combustion efficiency and reduce hydrocarbon fuel usage, particularly in internal combustion engines for vehicles. Proposals that seek to avoid the use of external hydrogen supply or onboard hydrogen storage have generally called for the use of electrolysis cells to generate hydrogen gas or hydrogen-oxygen electrolytic mixture onsite or onboard a vehicle and inject the gas output into a hydrocarbon fuel-air mixing chamber or carburetor for induction into an internal combustion engine. One such proposal is described by A. Dulger and K. R. Ozcelik, in "Fuel Economy Improvement By On Board Electrolytic Hydrogen Production", International Journal of Hydrogen Energy, Vol 25, Pg 895-897, Pergamon Press, 2000.

Other proposals include U.S. Pat. No. 5,105,773 to Cunningham et al, issued Apr. 21, 1992, which disclosed use of hydrogen-based electrolyte fluid such as potassium hydroxide. A flash arrestor is used to ensure that no backfire impacts the system, and the level of electrolyte fluid is optically monitored through the use of a liquid level sensor.

U.S. Pat. No. 5,513,600 to Teves, issued May 7, 1996, disclosed using hydrogen gas generated from two or more electrolytic cells energized by high density direct current of as much as 5,000 amperes supplied by an onboard direct current generator. The induction of hydrogen gas into the carburetor is regulated by a foot pedal-controlled butterfly valve in the engine's air intake manifold. The hydrogen gas is claimed to displace up to as much as 80% of the hydrocarbon fuel used in an internal combustion engine after a steady state condition is achieved.

U.S. Pat. No. 7,021,249 of Christison, issued Apr. 4, 2006, disclosed hydrogen generation from a saltwater electrolyte solution through electrolysis for enriching a hydrocarbon-based fuel for an internal combustion engine. The saltwater solution provides better conductivity for electrolytic dissociation of hydrogen and oxygen. The dissociated oxygen is diverted and exhausted to the atmosphere, while the hydrogen gas is ported to the carburetor of the engine through a mixing tube venturi for delivery of the resulting hydrogen-enriched mixture to the engine combustion chamber.

U.S. Published Patent Application 2007/0012264 of Holt et al, published Jan. 18, 2007, disclosed use of an electrolytic fluid of water and sodium bicarbonate for generating hydrogen-oxygen gas. The electrolytic cells have a stack of closely-spaced, alternating cathode and anode plates immersed in the electrolyte solution, and energized by a high density direct current of as much as 5,500 amperes supplied by a generator or alternator. A current regulator is controlled by a computer attached to the gas foot pedal or the main automobile computer, or a potentiometer may be used. The induction of electrolyzed hydrogen-oxygen gas into the carburetor is regulated by a foot pedal-controlled butterfly valve in the engine's air intake manifold. The electrolyte solution temperature is controlled by an air-conditioning line, water-cooling line, or thermostat. An anti-backfire device is provided in the hydrogen-oxygen supply hose connected to the intake plate that delivers hydrocarbon fuel into the airflow passageway.

U.S. Published Patent Application 2009/0148734 of Wang et al, published Jun. 11, 2009, disclosed use of an electrolyzer cell to generate hydrogen and oxygen gas that is stored in an onboard gas container. A pressure regulator controls the feed of hydrogen and oxygen gas mixture from the storage container to the carburetor for the engine.

U.S. Published Patent Application 2010/0038236 of Rivera et al, published Feb. 18, 2010, disclosed use of a pair of electrolyzer cells to dissociate hydrogen and oxygen gas delivered to the vehicle's air intake system, at the intake manifold and at the main air intake duct leading to the intake manifold. The electrolyzer cells supply the hydrogen/oxygen gas mixture "on demand" in the respective injection paths depending on operating conditions. When the engine is idling, there is a high level of vacuum in the intake manifold, drawing gaseous fuel from one electrolyzer cell. When the engine is accelerated to higher RPM, a higher vacuum draws gas mixture from the other electrolyzer cell. A check-valve disconnect coupling in each gas delivery hose serves as a flash-back arrester. The electrolyte fluid is water and sodium bicarbonate. The electrode structure is made from strands of stainless steel wire twisted together in a rope/cable-like form, then formed into a helix.

The prior art proposals have had significant disadvantages in terms of high current densities required for onboard electrolytic dissociation of sufficient hydrogen or hydrogen-oxygen gas for enrichment of hydrocarbon fuel combustion, electrolytic cells employing corrosive or contaminant-containing minerals for boosting conductivity or gas dissociation of the electrolytic solution, and complex mechanisms for diverting oxygen gas, storing hydrogen gas, and/or regulating the supply of hydrogen-oxygen gas mixture to the hydrocarbon fuel-air mixing chamber. It would be highly desirable to provide an electrolytic cell that can operate on only water as an electrolyte fluid to generate sufficient hydrogen gas for enrichment of hydrocarbon fuel, while eliminating corrosive or contaminant-containing minerals that can degrade the performance or service life of the electrolytic cell. It would be further desirable to provide a simple mechanism that can maintain the generated hydrogen gas in a stable condition from recombining with oxygen in the output gas flow, in order to avoid complex mechanisms for separating hydrogen from oxygen gas, storing the hydrogen gas, cooling the gas mixture, and/or otherwise regulating the gas flow.

SUMMARY OF INVENTION

In accordance with the present invention, a system for hydrogen gas enhancement of hydrocarbon fuel combustion employs a closed electrolyzer vessel into which water is circulated from a water circulation port at a water level to be maintained in said electrolyzer vessel and returned by a water return line into a return port at the bottom of the vessel, an electrode plate assembly having a series of plates including cathode plate, anode plate, and inner plates arranged in parallel, which is mounted in a lower part of the vessel and immersed in water below the water level maintained in the vessel. The electrode plate assembly has a voltage applied across the cathode and anode plates to dissociate water into constituent hydrogen and oxygen gases which are collected in an upper part of the vessel and inducted through an output port for mixing with an air intake for hydrocarbon combustion. An air injector is arranged in the water return line into the vessel to inject air in the water flow for causing air bubbling in the water supplied between and around the plates of the electrode plate assembly. Only water is used as the electrolyte fluid without any additives.

In a preferred embodiment, the electrolyzer plates are arranged in a unit stack of 7 plates, which has two outer cathode plates, one inner anode plate, and two spaced inner plates between each cathode plate and anode plate. The stack of 7 plates are arranged with preferred inter-plate spacings of 0.6 mm, 1.2 mm, 2.4 mm, 2.4 mm, 1.2 mm, and 0.6 mm, to which a plate voltage in the range of about 12 to 36 volts VDC is applied. Together with air bubbling of water between and among the plates of the unit stack, the electrode plate assembly can produce sufficient hydrogen gas for enhancement of hydrocarbon fuel combustion using a low amount of electrical power in the range of 96 watts. No chemical agents for boosting electrolyte conductivity or dissociation performance need to be added to the electrolyte water.

As may be required for the intended capacity of hydrocarbon fuel combustion, the hydrogen gas output of the electrolyzer vessel can be multiplied by combining multiple unit stacks of 7 plates each in a row or in other configurations such as a circumferential array in a cylindrical vessel.

The hydrogen gas dissociated from oxygen gas in the electrolyzer vessel is maintained in a stable condition in the output gas flow by an electromagnetic coil assembly wrapped around an output pipe made of a ferromagnetic material such as iron. The wire turns of the coil assembly are arranged in a conical form in progressive stages. An AC voltage is applied to the electromagnetic coil at a fluctuation frequency that causes lighter hydrogen gas molecules to become separated from heavier oxygen, nitrogen, and carbon dioxide gas molecules as they move through the output pipe. This separation minimizes recombining in transit, and avoids risk of flashback from the air intake manifold. The hydrogen gas-separation device avoids the need for more complex mechanisms used in the prior art for diverting oxygen gas, storing hydrogen gas, cooling the gas mixture, or otherwise regulating the output flow of hydrogen gas.

As adapted for hydrocarbon fuel combustion in a power generator such as a 140 KW fuel-fired electrical generator, the hydrogen gas output of the electrolyzer vessel is multiplied by combining an array of eight (8) sets of two unit stacks of 7 plates each (for a total of 16 electrode plate stacks) in a circumferential array in cylindrical vessel. With a power supply of 60 VDC at 4 amps applied to each stack of electrodes, applied power of 3,840 watts can generate hydrogen gas sufficient for enhanced hydrocarbon combustion in the 140 KW generator. The system is capable of running on 85% water-generated gas and 15% LPG fuel, for an increase in fuel efficiency of about 500%.

As adapted to the internal combustion engine of a vehicle, the hydrogen-oxygen gases generated in the electrolyzer vessel are inducted from the output port by intake vacuum pressure from the air intake manifold to the carburetor or fuel injection system for the engine. The electrolyzer vessel can supply sufficient hydrogen gas for operation of the vehicle engine with about 75% water-generated gas and 25% hydrocarbon fuel, thereby greatly reducing the hydrocarbon fuel used per mile the vehicle is driven.

Other objects, features, and advantages of the present invention will be explained in the following detailed description of the invention having reference to the appended drawing.

BRIEF DESCRIPTION OF DRAWINGS

FIGS. 7A and 7B are schematic diagrams in perspective and plan views of an electrolyzer plate array for a hydrogen gas enhancement system for a power generator.

DETAILED DESCRIPTION OF INVENTION

In the following detailed description of the present invention, certain preferred embodiments are illustrated providing certain specific details of implementation. The principles of invention are deemed to have broad application to electrolyzed hydrogen gas enhancement of hydrocarbon fuel combustion. Those skilled in the art will recognize that other variations, equivalents and modifications may be made given the disclosed principles of the invention.

Figure 1:
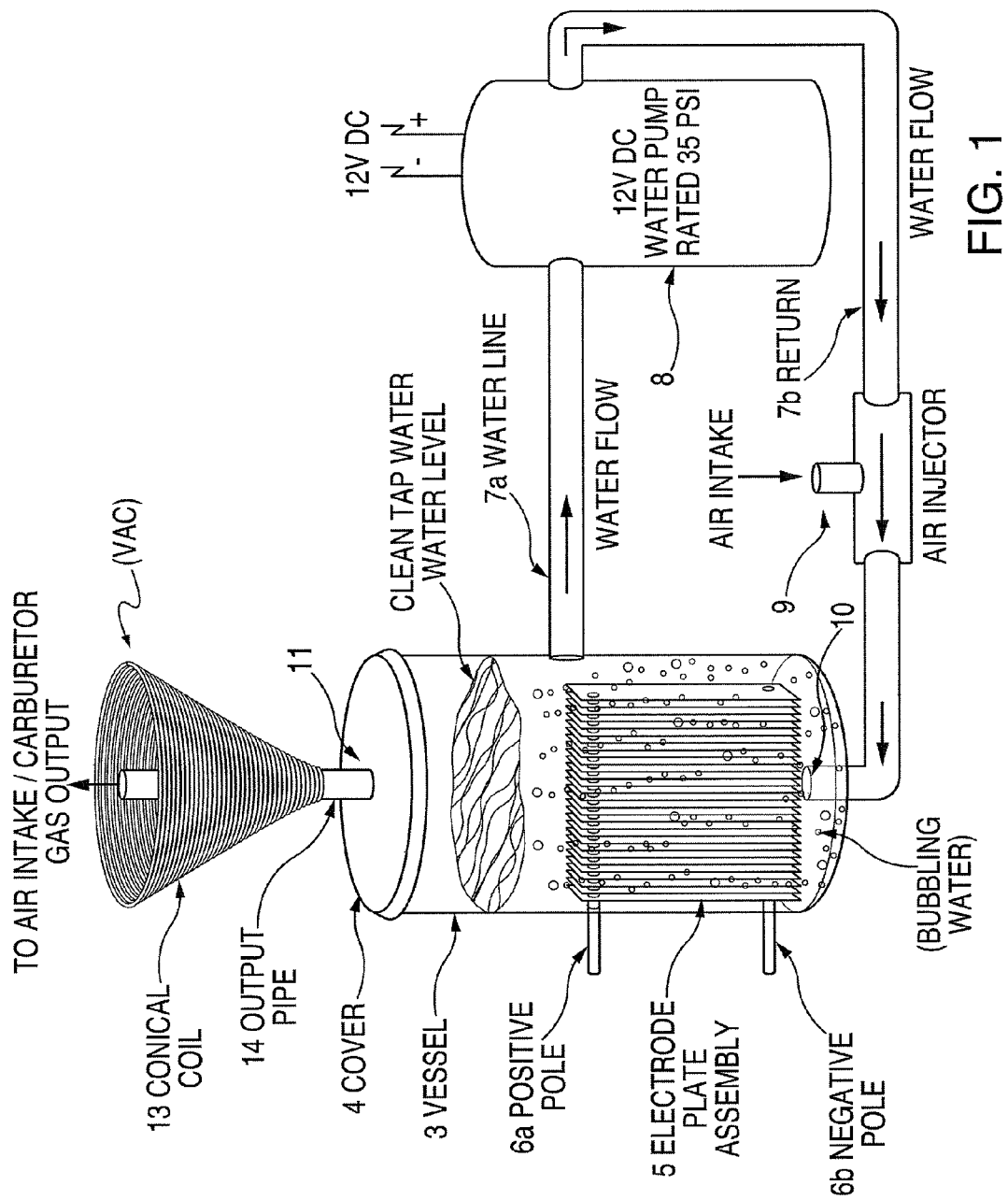
FIG. 1 is a schematic diagram illustrating a system in accordance with the present invention for electrolyzed hydrogen gas enhancement of hydrocarbon fuel combustion.

An overall architecture for a system in accordance with the present invention is described below for achieving electrolyzed hydrogen gas enhancement of hydrocarbon fuel combustion. The system is described as particularly adapted for use in a fuel-fired power generator and for an internal combustion engine of a vehicle. Referring to FIG. 1, an electrolyzer vessel 3 is pressure-sealed with a cover 4 and contains an electrode plate assembly 5 in a lower part of the vessel 3. Simply water is used as the electrolyte fluid, which may be supplied as clean tap water. The water is circulated into the electrolyzer vessel 3 by a water circulation loop consisting of a water circulation line 7a leading from an upper part of the vessel (above the level of the electrode plate assembly 5) to a water circulation pump 8. A water return line 7b from the water pump 8 feeds back into a water return port 10 in the bottom of the electrolyzer vessel 3. An air injector 9 is arranged in the water return line to introduce air bubbling in the water flow between and among the electrolyzer plates. The water circulation loop is operated to maintain a predetermined water level in the vessel above the electrode plate assembly 5 immersed therein.

The water circulation pump in the water containment vessel 8 is operated to maintain a circulating water flow between and around the electrode plate assembly 5 in the electrolyzer vessel 3. Application of an electrical voltage across a positive pole 6a connected to cathode plates and a negative pole 6b connected to anode plates of the electrode plate assembly 5 generates an electrical field across the plates that causes dissociation of water into constituent hydrogen and oxygen gases. The gases rise into the upper part of the electrolyzer vessel 3 above the water level, from which they are output to an air intake for fuel-fired combustion or a carburetor manifold for a vehicle engine. A conical coil assembly 13 is arranged around an iron output pipe 14 leading from the output port 11 at the top of the electrolyzer vessel 3 to apply alternating electrical fields that cause the hydrogen and oxygen gases to separate so that they remain in stable condition without recombining in transit.

In a preferred embodiment, the electrolyzer vessel 3, cover 4, and electrolyzer plate assembly 5 are made of selected metallic alloys to withstand degradation and corrosion. The electrolyzer vessel 3 is formed in a cylindrical shape, sealed by the air-tight cover 4, and sized to fit the electrode plate assembly 5 in the lower part of the vessel. The water circulation pump in the water container tank 8 can have a capacity of 35 PSI and operate on 12 VDC. The water circulation line 7, water return port 10 into the bottom of the electrolyzer vessel, and the output port for the gas output pipe 11 at the top of the vessel can be about ½ inch (13 mm) in diameter.

Figure 2:
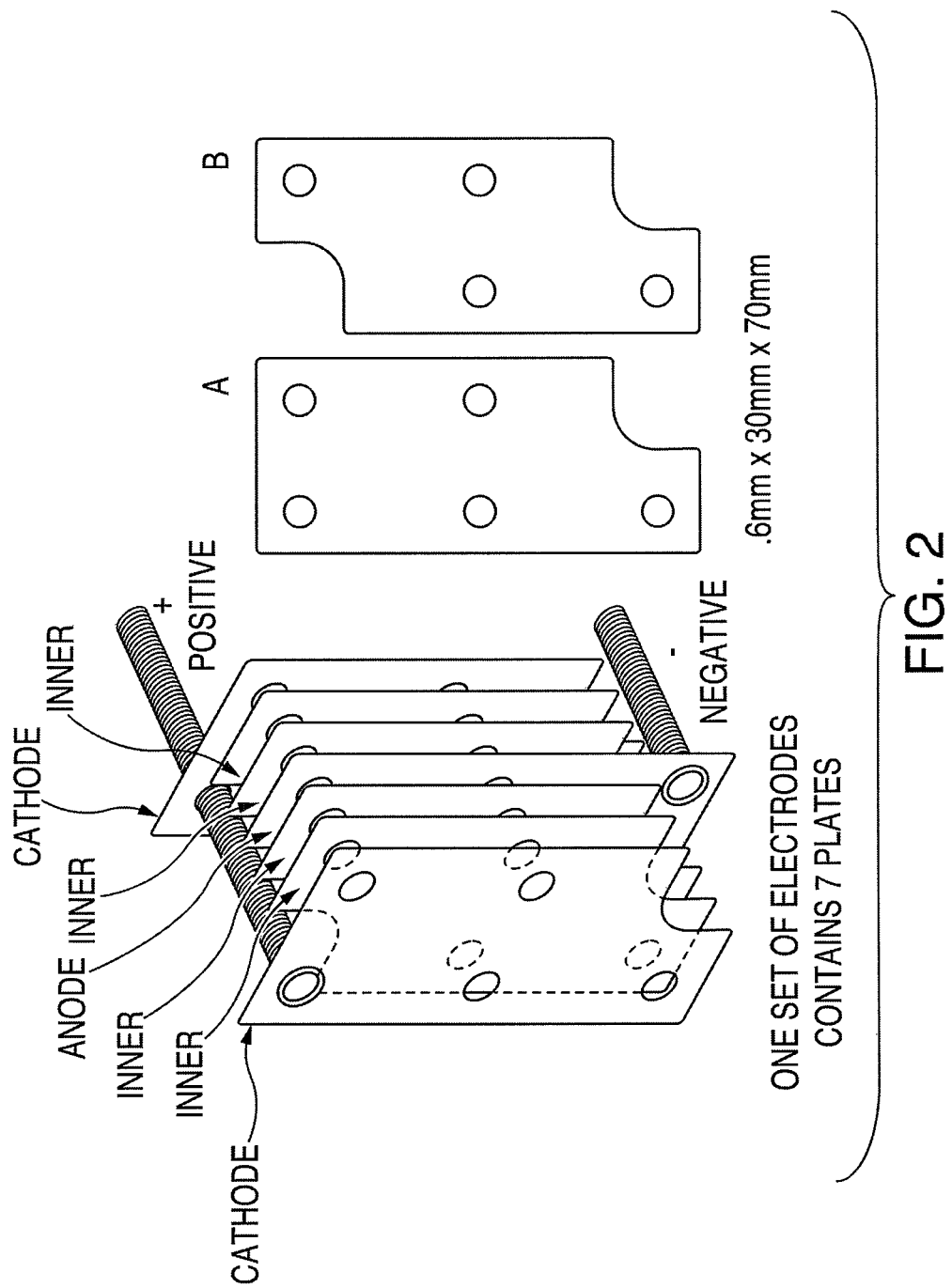
FIG. 2 is a schematic diagram illustrating a preferred embodiment for an electrode plate stack assembly for use in an electrolyzer vessel.

A preferred electrode plate assembly 5 is constituted by a stack of 7 plates in series. Referring to FIG. 2, the plates are formed of the same plate size, preferably about 0.6 mm thickness, 30 mm width and 70 mm height. The outer two plates in each set of 7 plates are cathode plates coupled to the positive pole 6a, and the middle plate is an anode plate coupled to the negative pole 6b. Two inner plates are arranged on each side of the anode plate spaced at predetermined spacings from the outer cathode plate, and are not connected to a pole. Each plate is formed of metallic alloy that is non-magnetic, non-corrosive, non-degradable, and highly conductive. The electrode plate assembly 5 is mounted to the walls in a lower part of the electrolyzer vessel by insulating mounts and spacers. For increased hydrogen gas generation, the electrolyzer plate assembly may be formed by an array of multiple plate stacks of 7 plates each. For example, the electrolyzer plate assembly in FIG. 1 has 4 stacks of 7 plates each in a row, for a total of 28 plates.

Figure 3:
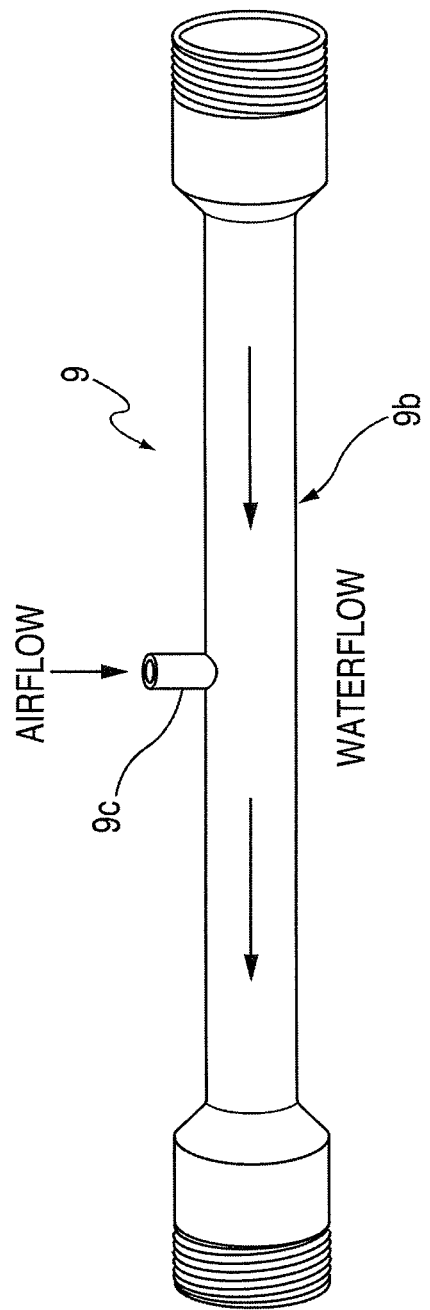
FIG. 3 is a diagram illustrating a preferred embodiment of an air injector to generate bubbling in the water flow to the electrolyzer vessel.

Referring to FIG. 3, a preferred form of air injector 9 is illustrated having a constricted middle section 9b which induces a higher velocity water flow by the Bernoulli principle. For example, the injector ends may have a ½ inch (13 mm) diameter, and the constricted middle section may have a ¼ inch diameter (6.5 mm), causing the water to flow in the middle section at 4 times the velocity of the flow in the water return line. An air intake valve 9c is arranged at the midpoint of the section to induct air into the water return line by vacuum pressure, which causes air bubbling to be formed in water supplied into the vessel and up through the electrode plates of the assembly.

The air bubbling in the water flow to the electrolyzer vessel is believed to increase the surface area of water molecules relative to the voltage and current density across the cathode and anode plates, which increases the rate of dissociation of hydrogen and oxygen gases without the need for high electrode voltages or current densities. It also tends to keep the temperature of the water in a constant range. The air bubbling of water in the electrode stack in effect atomizes the water for easier dissociation of hydrogen gas using electrical power as low as about 96 watts for a single stack of electrode plates. For example, an air injector rated for 35 psi water flow with ½ inch tube ends can provide sufficient air injection for hydrogen gas generation for a 100 HP engine. No chemical agents for boosting electrolyte conductivity or dissociation performance needed to be added to the water.

Figure 4:
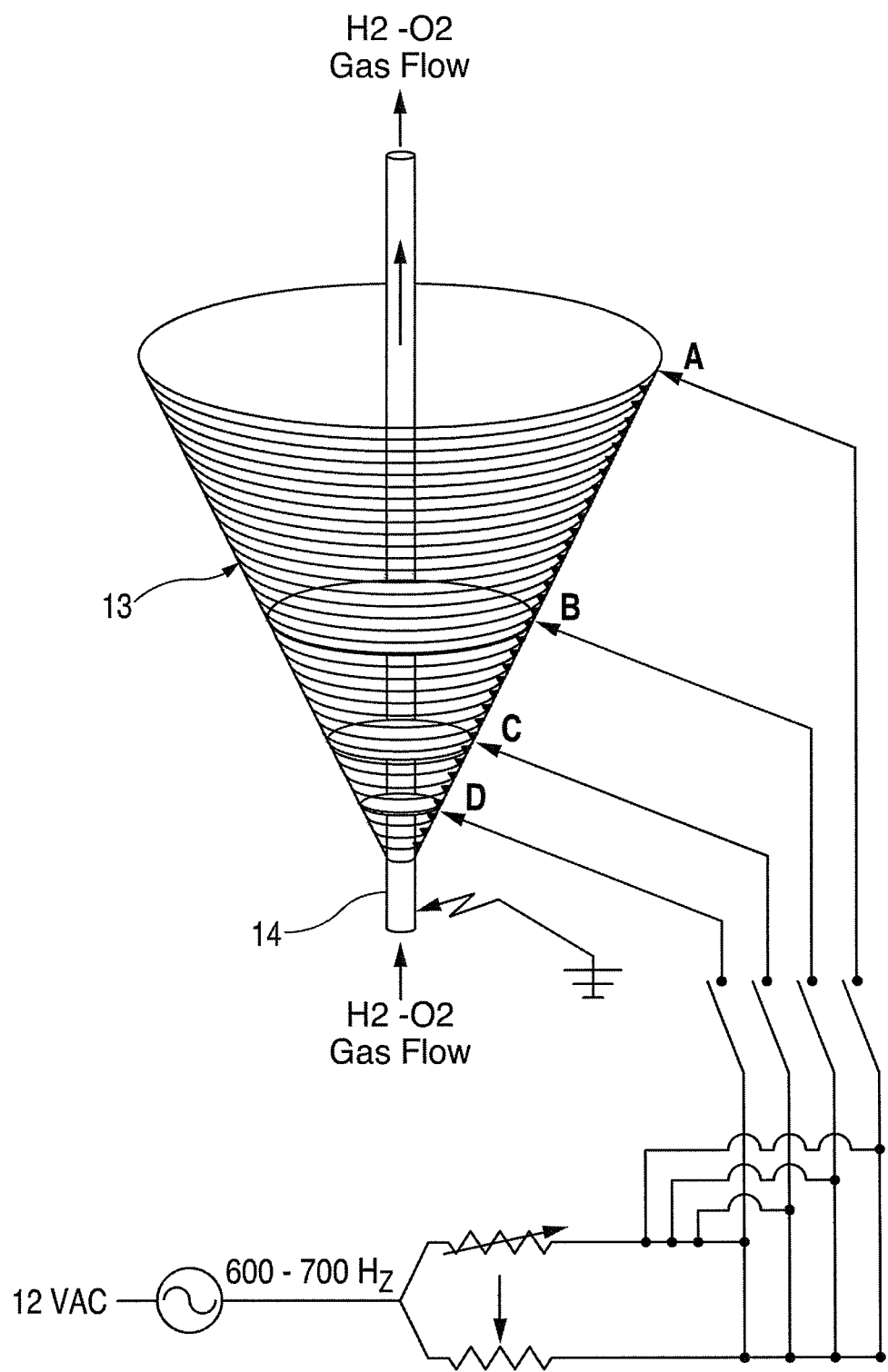
FIG. 4 is a schematic circuit diagram of an electrical circuit for powering an electromagnetic coil for keeping hydrogen gas stable in a gas output flow.

FIG. 4 is a schematic diagram of a preferred embodiment of a device for maintaining generated hydrogen gas in stable condition in transit for enhanced hydrocarbon combustion. A conical coil assembly 13 is wrapped around an output core pipe 14 made of ferromagnetic material such as iron. The coil assembly has wire turns arranged in Stages A, B, C, D, etc., as shown. The number of wire turns in each stage follows an arithmetic progression corresponding to the length of pipe traversed in each stage, for example, 80 windings between A and B, 42 windings between B and C, 22 windings between C and D, and 11 windings between D and the lower apex of the cone. An alternating voltage is applied across the coil from the open end to the apex of the cone connected to ground. A rheostat and potentiometer as indicated in FIG. 4 may be used to control staging of voltages applied to Stages A, B, C and D. The fluctuating electromagnetic fields generated by the coil assembly causes the lighter hydrogen gas molecules to become separated from the heavier oxygen, nitrogen, and carbon dioxide gas molecules (combined with ambient air bubbling) that predominate in the gas flow, acting like a centrifuge as they move through the iron output pipe 14. It is found that an alternating frequency of about 600-700 Hz can produce good separation of hydrogen gas from the other gases.

The electromagnetic coil assembly keeps the hydrogen and oxygen gases from recombining in transit and avoids the need for separating the oxygen gas from the hydrogen gas, for cooling the gases in transit, and/or for applying a flash arrester regulator in the system. Concentration of the hydrogen gas in a separated flow enables it to burn at a lower flashpoint rate to match the burning flashpoint of other hydrocarbon fuel, so that they combine to burn more completely and cleanly in the internal combustion chambers. All of the components of the electrolyzed hydrogen gas system can be configured and sized corresponding to the fuel consumption requirements of the end use application for hydrocarbon combustion.

Figure 5:
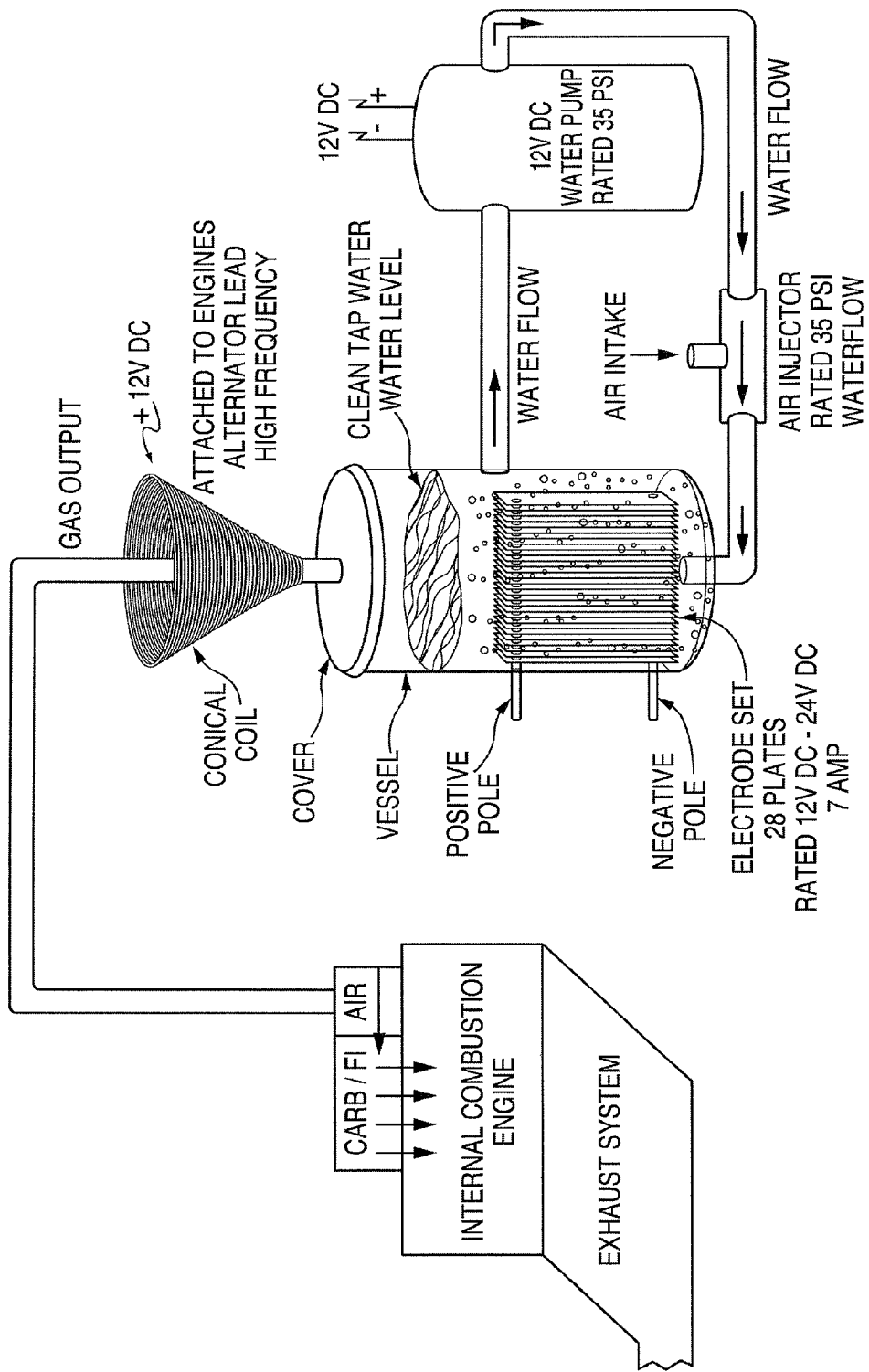
FIG. 5 is a schematic diagram of a hydrogen gas enhancement system adapted for supply to the air intake manifold for internal combustion engine of a vehicle.

FIG. 5 is a schematic diagram of a hydrogen gas enhancement system adapted for supply to the air intake manifold for internal combustion engine of a vehicle. The gas output from the electrolyzer vessel is supplied to the air intake manifold for a carburetor or fuel injection system supplying air-fuel mixture to an internal combustion engine. It is found that the typical vacuum pressure of an air intake manifold can draw in sufficient hydrogen gas in the gas output flow to supply the necessary enhancement to hydrocarbon fuel combustion. With more complete burning of hydrocarbons due to hydrogen gas flash enhancement, the engine exhaust can output exhaust gases far lower in noxious fumes and carbon byproduct gases.

Figure 6:
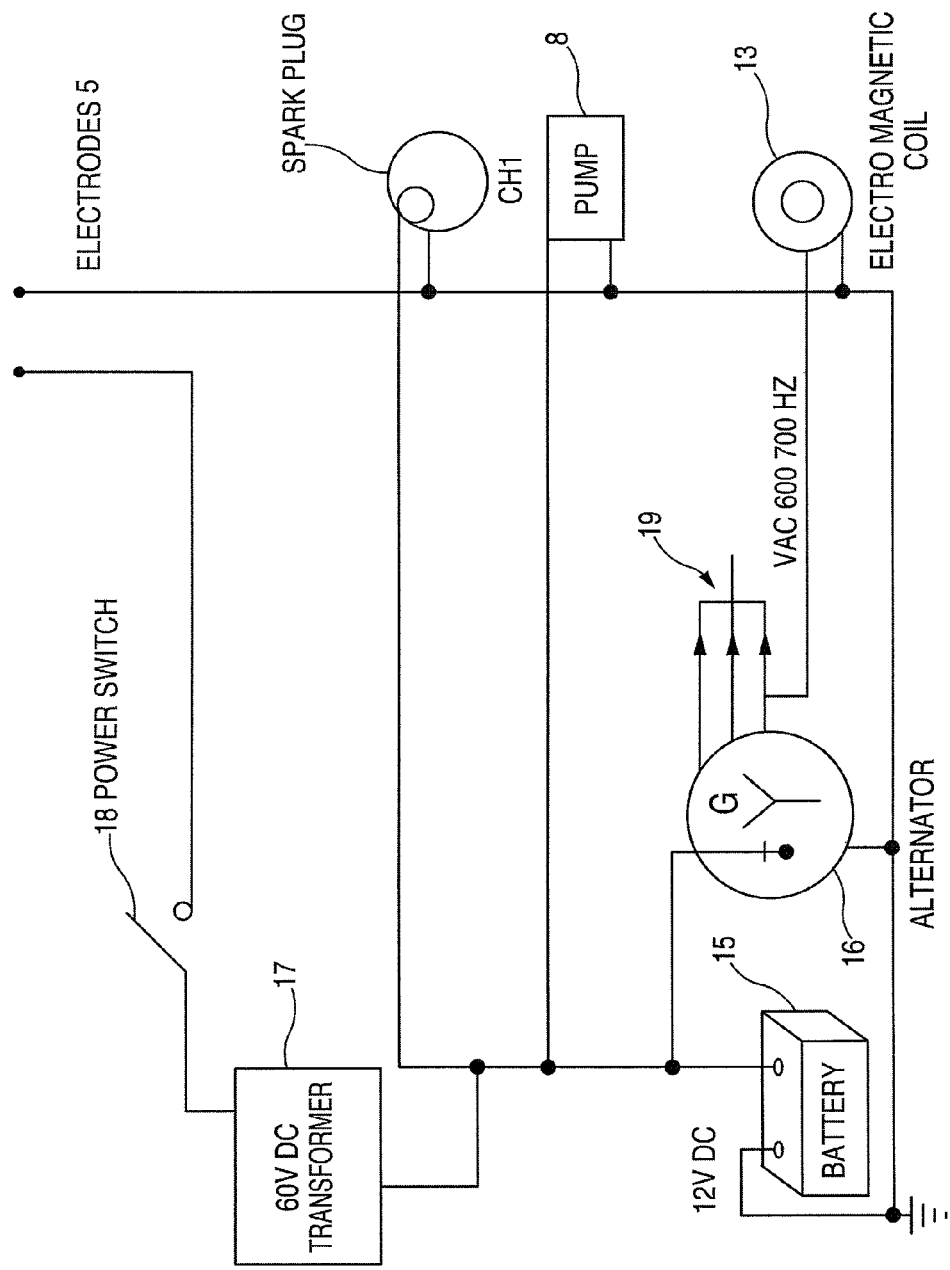
FIG. 6 is a schematic diagram of an electrical circuit for powering the hydrogen gas enhancement system for a vehicle.

FIG. 6 is a schematic circuit diagram of an electrical circuit for powering the electrolyzed hydrogen-oxygen gas enhancement system. A typical vehicle battery 15 is coupled to an alternator 16 driven by the mechanical motion of the engine drive shaft. The alternator output current is rectified to DC to charge the battery and supply DC power to the pump 8 for the water circulation system as well as other components of the vehicle electrical system such as the spark plugs. A DC transformer 17 steps up the DC voltage, such as to 60 VDC, to supply the electrode plate assembly 5 through a power switch 18. The alternator 16 also supplies an AC voltage output through a diode bridge 19 for the electromagnetic coil assembly 13. The frequency of the VAC output is targeted to about 600-700 Hz.

The hydrogen gas flow from the electrolyzer vessel can be driven entirely by control of engine RPM using the conventional fuel throttle operated by the driver's foot pedal and the resultant vacuum pressure of the air intake manifold to the engine. The electromagnetic coil assembly maintains the hydrogen and oxygen and other gases separate in transit, thereby minimizing their tendency to recombine and avoiding risk of an explosion if a flashback or high temperature gas surge from the air intake manifold occurs. The hydrogen gas enhances hydrocarbon fuel combustion chemically and exothermically. Hydrocarbon fuel usage can be run leaner and burned more completely and cleanly, thereby increasing fuel efficiency and reducing exhaust gas pollutants. The by-product of hydrogen and oxygen gas recombination is only water vapor. Once the engine is turned off, there is no residue or effluent but water, which would make it the safest fuel system possible.

The electrolyzer vessel is preferably made of materials that can withstand corrosion and degradation, such as stainless steel (grade T-316). A titanium and germanium alloy at 60%-40% ratio would be most effective to withstand corrosion. The vessel should be made of metallic material to contain the electrical fields, and plastic material is not considered appropriate.

The electrode plate assembly may be made of alloys that are non-degradable, non-corrosive, non-magnetic, and highly conductive. The assembly is preferably constituted by a unit stack of 7 plates, each of the same size, preferably in the range of 30 mm wide, 70 mm high and 0.6 mm thick, and arranged in parallel. For an electrode voltage of 12 VDC applied across the electrode poles, a stack of 7 plates has the following preferred plate spacings:

Plate 1 (outer cathode) and Plate 2 (first inner plate) is 0.6 mm;

Plate 2 (first inner plate) and Plate 3 (second inner plate) is 1.2 mm;

Plate 3 (second inner plate) and Plate 4 (anode) is 2.4 mm;

Plate 4 (anode) and Plate 5 (third inner plate) is 2.4 mm

Plate 5 (third inner plate) and Plate 6 (fourth inner plate) is 1.2 mm;

Plate 6 (fourth inner plate) and Plate 7 (second outer cathode) is 0.6 mm

The 7-plate unit stack can generate 16 times the amount of hydrogen gas as can be obtained from two electrode plates alone at 12 amps of current input. With air injection, the current requirement drops to 8 amps or less for generation of the same amount of hydrogen.

The above unit stack plate spacings are suitable for applied voltage of 12 to 36

VDC for a small (about 100 HP) vehicle engine. For higher electrode input voltages up to 200 VDC, the plate spacings may vary from 0.6 mm to 5 mm. The plates may be held together with nylon bolts, washers and nuts. The thickness of the nylon washers between plates may start at 0.6 mm and be increased incrementally as the voltage input increases. For voltages from 12 to 36 VDC, the washer spacing may be 0.6 mm. For voltages to 60 VDC, the washer spacing may be 1.8 mm. Each additional 36 VDC may require 1.8 mm of extra spacing of washers. For example, if a voltage of 120 VDC is applied to the electrode plates, the spacings of plates per unit stack are 1.2 mm, 2.4 mm, 4.8 mm, 4.8 mm, 2.4 mm, and 1.2 mm. If the applied voltage is 200 VDC (for up to about 450 HP engine), the spacings per unit stack are 2.4 mm, 4.8 mm, 9.6 mm, 9.6 mm, 4.8 mm, and 2.4 mm.

The cathode plate assembly may be optimized with the use of a 50/50 by volume titanium/germanium alloy, which has a high resistance against corrosion by hydrogen. Germanium may be substituted with gallium, silver, platinum, thallium or palladium, as these metals will allow results close to that obtained with germanium. In the periodic table of elements, all the listed substitutes for germanium are clustered around the same position. This may be due to the relationship of the properties of elements to their electron structures and atomic weights. The anode plate may be made of another alloy, such as 50% zirconium and 50% tin by volume, which has a high reflective quality of conductive metallic elements and is also very resistant to hydrogen corrosion. The inner plates may be made of another alloy, such as 50% molybdenum and 50% cadmium, or can also be made of zirconium-tin.

The preferred electromagnetic coil assembly has a size of about 1.5 inch by 1.5 inch (38 mm×38 mm), and is cone shaped with an angle of 60 degrees at the apex. The core pipe may be made of iron, such as grade Dactal 65-45-12 which is heat treated for one hour at a temperature of 350° F. and coated with enamel one millimeter thick. The core pipe may have an inner diameter of ¼ inch. The outer cone may be wrapped with magnet wire of 28 gauge. It may contain 15 layers of coiling with 155 wire turns in each layer, with wax paper between each layer. The coil may be vacuum-sealed in a stainless steel metallic casing for optimum performance.

Electrical Fuel-Fired Generator Example:

The electrolyzed hydrogen gas enhancement system can be productively used in a hydrocarbon fuel-fired, electrical power generator. The system was tested on a 140 KW power generator operating on LPG fuel. A generator of this size can power a small building or small community. The electrolyzer vessel was increased to a capacity of two and a half gallons of water and employed an array of 16 stacks of plate electrodes of 7 plates each. FIGS. 7A and 7B are schematic diagrams in perspective and plan views of the electrolyzer plate array for the 140 KW power generator. Each set of electrodes had the same configuration and spacings as described above. Power supply of 60 VDC at 4 amps was applied to each set of electrodes, for a power consumption of 3,840 watts for the large vessel. The water circulation ports and the output port were increased to ¾ Inch, and water was circulated at 90 PSI and the air injector was also rated 90 PSI. The system was found capable of running on 85% water-generated gas and 15% LPG fuel, for an increase of fuel efficiency of about 500%.

Another test was run with the LPG fuel valve turned all the way down to a closed setting. The generator ran almost entirely on water for nearly 13 seconds. Subsequently, we were not able to run the generator on water alone. We added a flowmeter onto the fuel line to determine the flow of LPG fuel, and found that the engine could run stably on up to about 90% of water-generated hydrogen gas and only 10% of LPG fuel. The electrical input used to power our apparatus was up to 4.4 KW, or about 3% of the generator's capacity.

Running on propane only, the 140 KW generator would use about 39 lbs/hr to generate 140 KWHs of electricity, equivalent to about 480,000 BTUs, compared to the combustion heat content of the equivalent propane of about 780,000 BTUs. This means that the typical generator is running at about 61% conversion efficiency. With hydrogen gas enhancement by water electrolysis, the generator's propane consumption dropped to about 6 lbs/hr of propane, which indicated that (a) the enhanced propane conversion efficiency was probably closer to 100%, not just 61%; (b) there are reactions occurring with LPG combustion that may generate additional energy, i.e., something like a Fischer-Tropsch synthesis which generates high-energy releasing compounds like acetylene, ketones and others; and/or (c) since the generator was running at least 100 degrees F. lower temperature with water electrolysis than without, the occurrence of an endothermic synthesis reaction in the generator under pressure appears likely. An exhaust gas analysis (i.e., water, $CO_2$, NOx, etc.) would be required to confirm the complete combustion process.

We calculated the amount of hydrogen gas required to generate 85% of the energy in the 140 KW generator experiment. Using the enthalpy of fusion for water, we found that over a 24 hour period 8 liters of water should have been electrolyzed into hydrogen/oxygen. However, in practice, the water consumption was only about 4 liters. This indicated that entrapped water vapor in the air injector bubbling to the electrolyzer plates aided in the energy generation.

The above test indicated that the electrolyzed hydrogen gas enhancement system can be used to increase fuel efficiency in many types of hydrocarbon combustion applications. For example, it may be used effectively for welding, water and air heating, metal melting, incinerators, plasma heating, cooking, waste product burning and steam engines.

Automotive Vehicle Example:

An example of operation of the system for a small vehicle engine, such as 100 horsepower size, will now be described. The electrolyzer vessel 3 is filled with clean tap water up to ½ inch above the level of the water recirculation port. The voltage input to the electrode plate assembly 5 may be a minimum of 12 VDC, or through a step-up transformer as high as 200 VDC if needed. When the vehicle engine is started, the water circulation pump is turned on introducing a bubbling water flow into the electrode plate assembly. Power is supplied to the electrode plate assembly by turning on the power switch 18. Hydrogen gas is inducted from the electrolyzer vessel to the air intake manifold to the vehicle's carburetor or fuel injection system at a rate corresponding to the intake vacuum pressure. As a further enhancement, the input voltage to the electrode plate assembly may be controlled by a voltage controller to fluctuate based on the rate of acceleration and deceleration of the engine, which is detected by a throttle position sensor. The input voltage is therefore increased or decreased to create more or less hydrogen-oxygen gases based on the fuel demand. The air injector 9 controls the degree of induction of air for bubbling in the water flow in accordance with the circulation of water from the water containment tank via the water pump. All the parts work cohesively together to produce the required amount of water-generated hydrogen gas to meet real-time demand.

The electrolyzed hydrogen gas enhancement system was tested in a 1995 Honda Civic. The system was powered by the car battery having an output of 12 VDC at 6 amps. The test drive was 111 miles (188 kilometers). On average the car obtains about 24 miles per gallon (40 km/gal) of gasoline fuel. With the electrolyzed hydrogen-oxygen gas enhancement system, the car's fuel consumption was 67 miles per gallon (113 km/gal) of gasoline, and three tablespoons of water, which is nearly 180% increase in fuel efficiency. The total consumption of gasoline during the 111-mile drive was 1.75 gallon. The water used was simply tap water. No electrolyte additives were used. The vehicle's engine system appeared to run cooler and at a modestly higher power. The oil temperature was nearly 165 degree F., and exhaust temperature was nearly 637 degree F.

The vehicle continued to be tested with the system for over three thousand miles, with the result being consistently excellent. It was taken to a mechanic shop to evaluate the effect of the system on the vehicle. All spark plugs were found to be very clean with no carbon build-up whatsoever. Moreover, the engine ran much smoother with water-generated gas than with gasoline alone.

The vehicle test results are compared in Table 1 below to a test of a prior type of electrolyzed hydrogen-enhanced vehicle engine system which lacked the air injector, electrode plate specifications, and electromagnetic coil output gas flow control of the present invention. The prior research was published by A. Dulger and K. R. Ozcelik, Department of Mechanical Engineering, Kocaeli University, Kocaeli, Turkey, in the paper entitled "Fuel Economy Improvement By On Board Electrolytic Hydrogen Production", published in International Journal of Hydrogen Energy, Vol 25, Pg 895-897, Pergamon Press, 2000.

TABLE 1

|  | Vehicle Test | Kocaeli University |
| --- | --- | --- |
| Maximum Gas Supply | 12 l/h | 20 l/h |
| Cathode Electrode | Titanium Germanium | Carbon |
| Anode Electrode | Zirconium Tin | Platinum |
| Electrolysis Voltage | 12 VDC | 90 VDC |
| Electrolysis Current | 6 Amp | 3 Amp |
| Water | Tap water | Tap water |
| Water Tank Volume | 0.75 Liter | 2.5 Liter |
| Water Consumption | 45 ml/188 km | 100 ml/250 km |
| Water Supply Control | None | Electronic |
| Water Temperature | 35-45 C. | 45-50 C. |
| Cooling Mechanism | Water circulation (w/air injector) | Water cooled |
| Dimensions | 10 × 10 × 8 cm | 15 × 14 × 13.5 |
| Weight | 1 Kg | 2 Kg |

The test indicated that gasoline consumption was reduced by about 65% using the disclosed hydrogen gas enhancement system, compared with about 43% reduction in gasoline consumption in the Kocaeli research results.

The Honda car was also tested with a dynamometer emission test, comparing operation on gasoline alone and with hydrogen gas enhancement of combustion. The results of the test are shown in Table II below:

TABLE II

|  | Gasoline | Gasoline & H2 Enhancement |
| --- | --- | --- |
| RPM | 3200 | 3200 |
| Torque | 3.45 | 3.75 |
| Oil Temp. | 230 F. | 160 F. |
| Exhaust Temp. | 756 F. | 605 F. |
| Hydrocarbon Exhaust | 2416 ppm | 115 ppm (parts per million) |

The dynamometer test above shows very clear improvement in operation and a remarkable 20 times reduction in carbon emission from vehicle exhaust. That is about the level that can be currently achieved with a catalytic converter. The test indicated that nearly complete combustion was taking place, and that a cleanliness of exhaust was achieved without the need for a costly catalytic converter.

Lawnmower Test Example:

The electrolyzed hydrogen-oxygen gas enhancement system was tested in a twin-piston lawnmower that ordinarily runs on gasoline. We altered the carburetor slightly and assembled the water-generated gas apparatus to it, and connected the power supply to a battery with an output of 60 VDC at 4.2 amps. After many hours of testing, the engine's fuel performance was found to increase to about 210%. We then added a pin-valve into the fuel line, which limited the flow of gasoline to less than 5% in conjunction with the water-generated gas. The result was an increase in fuel performance of the engine by 200%.

The above tests showed that the hydrogen gas enhancement system can operate more effectively at lower electrode voltage to produce the required hydrogen gas more effectively from smaller amounts of water as compared to prior art tests and devices. It avoids entirely the use of electrolyte additives to increase electrolyte conductivity or gas dissociation performance, such as sodium hydroxide, potassium hydroxide, or other chemical agents. Use of such chemical substances can foul the internal combustion system and cause serious engine damage, resulting in costly repair. There is no need to separate oxygen from hydrogen gas, to cool the gas mixture, and/or to employ costly pressure regulator systems, as used in the prior art.

It is to be understood that many modifications and variations may be devised given the above described principles of the invention. It is intended that all such modifications and variations be considered as within the spirit and scope of this invention, as defined in the following claims.

The invention claimed is:

1. A system for hydrogen-oxygen gas enhancement of hydrocarbon fuel combustion comprising:
    a closed electrolyzer vessel in which water is circulated from a water circulation port at a water level to be maintained in said electrolyzer vessel and returned via a water return line into a return port at the bottom of the vessel,
    an electrode plate assembly comprised of a series of plates, including cathode plate, anode plate, and inner plates arranged in parallel, which is mounted in a lower part of the vessel and immersed in water below the water level maintained in the vessel,
    wherein the electrode plate assembly has a voltage applied across cathode and anode plates thereof to dissociate water into constituent hydrogen and oxygen gases which are collected in an upper part of the vessel and inducted from an output port of the vessel to an air intake for hydrocarbon combustion, and
    a conical coil of wire turns wrapped around an output pipe made of a ferromagnetic material which is coupled between the output port of the electrolyzer vessel and the air intake for hydrocarbon combustion,
    wherein said conical coil is arranged in progressive stages from a lowest stage at an apex of said conical coil arranged proximate the output port of the electrolyzer vessel to a highest stage having an open coil end proximate the air intake for hydrocarbon combustion, each stage having progressively more wire turns from lowest to highest progressive stages, and
    wherein an alternating voltage is applied across the conical coil from the open end to the apex of the conical coil which is connected to ground,
    whereby fluctuating electromagnetic fields are generated by the conical coil in order to cause dissociated lighter hydrogen gas molecules exiting the output port of the electrolyzer vessel to keep separated from recombining in transit with heavier oxygen and other gas molecules by acting as a centrifuge for keeping the gases separated as they move through the output pipe to the air intake for hydrocarbon combustion.

2. A system according to claim 1, wherein the conical coil is arranged in Stages A, B, C, and D, having 80 windings in Stage A, 42 windings in Stage B, 22 windings in Stage C, and 11 windings in Stage D at the apex of the conical coil.

3. A system according to claim 1, wherein an alternating frequency of about 600-700 Hz is applied for separation of the hydrogen gas from the other gases.

4. A system according to claim 1, wherein a rheostat and potentiometer are used to control a staging of voltages applied to the progressive stages of coil windings of said conical coil.

5. A system according to claim 1, wherein an air injector is arranged in the water return line into the electrolyzer vessel to inject air into the water flow returned via the water return line into the return port at the bottom of the vessel and between and around the electrode plate assembly for causing air bubbling of the air in the water flow supplied between and around the electrode plate assembly so that electrolysis of the water flow with bubbling of air is enhanced.

6. A system according to claim 1, wherein the electrode plate assembly is comprised of a unit stack of 7 plates of the same size arranged in parallel, including two outer cathode plates, a middle anode plate, and two spaced inner plates between each cathode plate and the anode plate.

7. A system according to claim 1, which is adapted to supply hydrogen gas generated in the electrolyzer vessel to an air intake manifold for a hydrocarbon fuel-fired electrical power generator to enhance hydrocarbon combustion with hydrogen gas in order to reduce hydrocarbon fuel usage by about 85%.

8. A system according to claim 1, which is adapted to supply hydrogen gas generated in the electrolyzer vessel to a vehicle engine in order to enhance hydrocarbon combustion with up to about a 180% reduction in hydrocarbon fuel usage in the vehicle engine.

9. A system according to claim 1, which is adapted to supply hydrogen gas generated in the electrolyzer vessel to a vehicle engine in order to enhance hydrocarbon combustion with up to about 20 times reduction in carbon emission from vehicle exhaust.

10. A system according to claim 1, which is adapted to supply hydrogen gas generated in the electrolyzer vessel to an electrical power generator operable with LPG fuel in order to enhance hydrocarbon combustion with up to about 500% increase in LPG fuel efficiency of usage in the electrical power generator.

* * * * *